March 18, 1952 V. I. DUDLEY 2,589,235
REELING DEVICE
Filed June 15, 1948 3 Sheets-Sheet 1
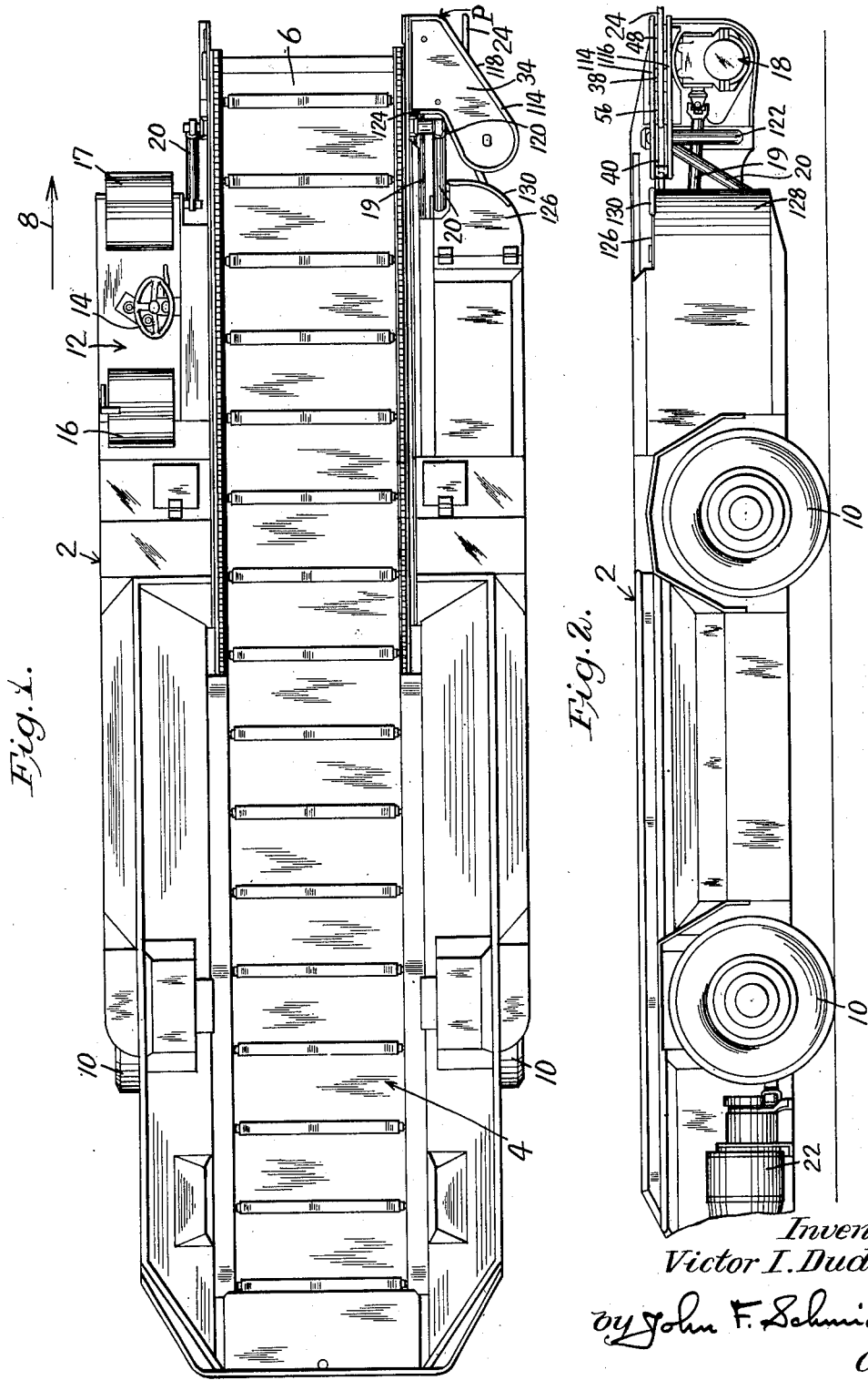
Inventor:
Victor I. Dudley.
by John F. Schmidt
atty.

March 18, 1952   V. I. DUDLEY   2,589,235
REELING DEVICE
Filed June 15, 1948   3 Sheets-Sheet 2
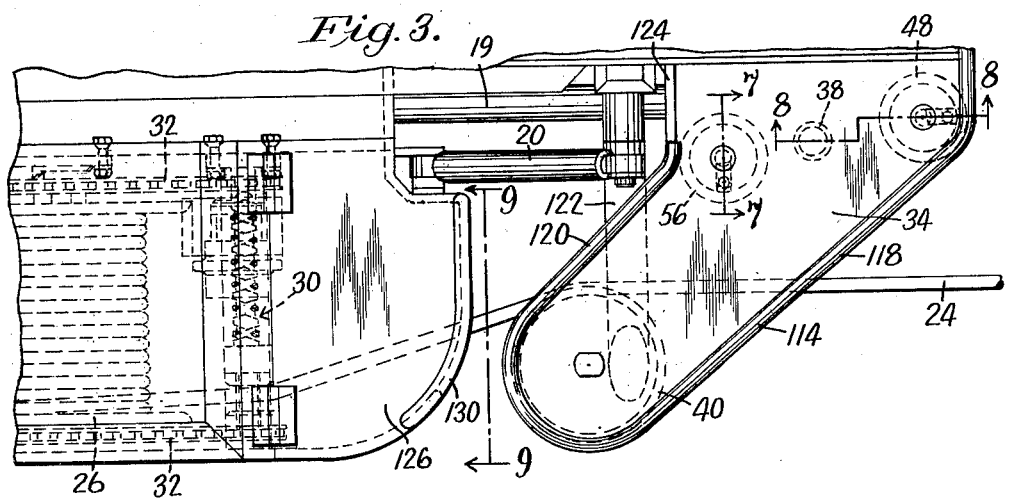
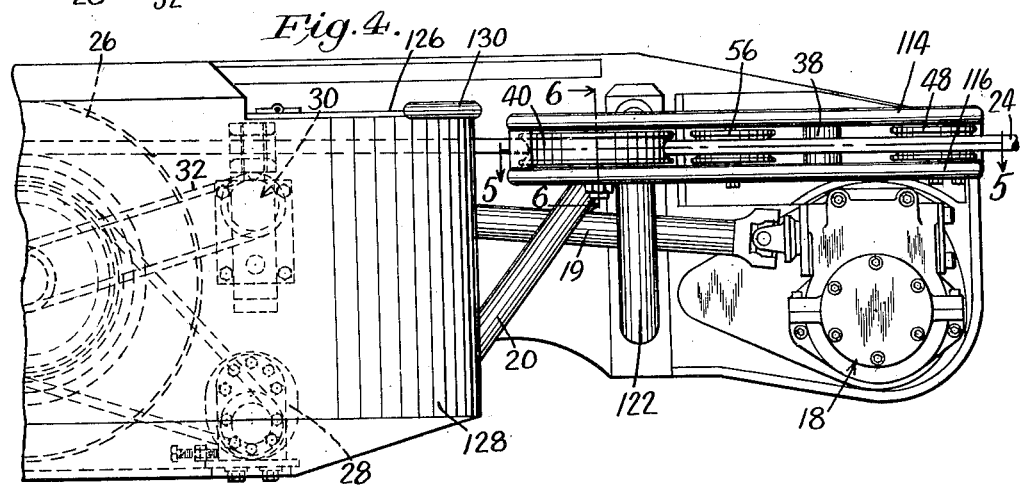
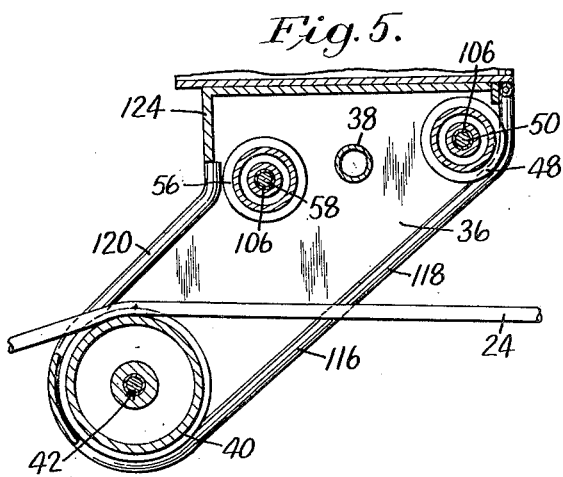
*Inventor:*
*Victor I. Dudley.*
by John F. Schmidt
Atty.

March 18, 1952 V. I. DUDLEY 2,589,235
REELING DEVICE
Filed June 15, 1948 3 Sheets-Sheet 3
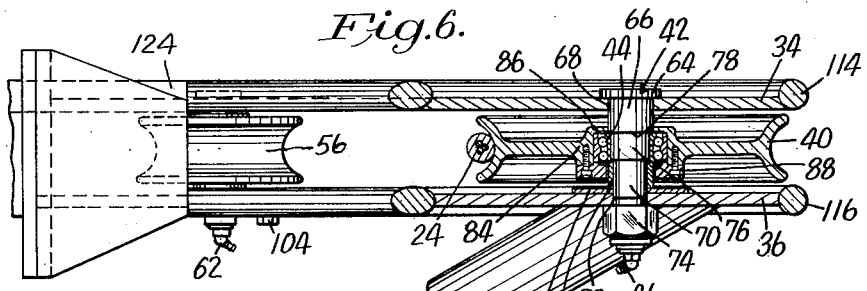
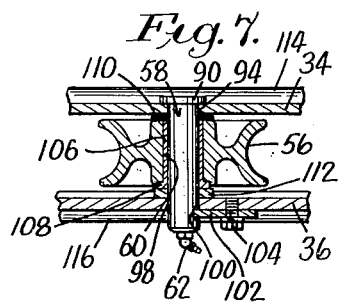
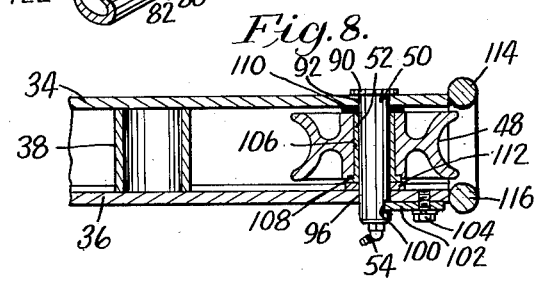
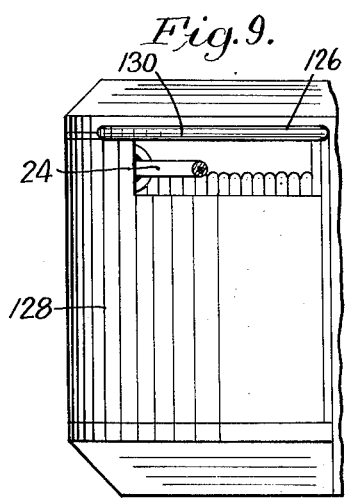
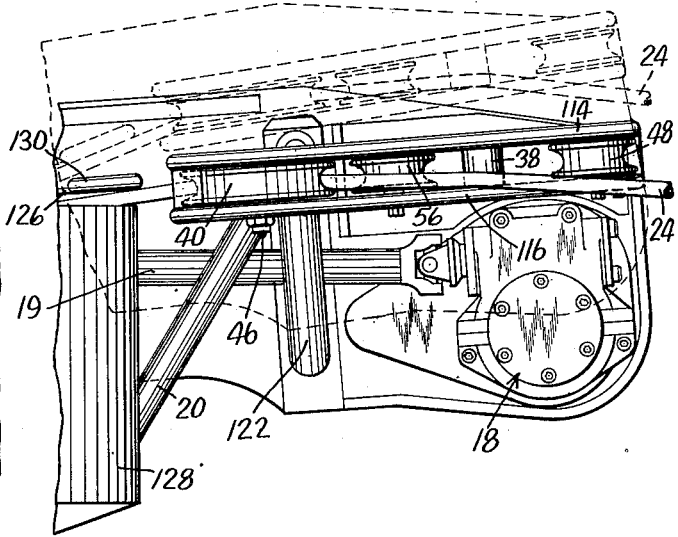
Inventor:
Victor I. Dudley.
by John F. Schmidt
atty.

Patented Mar. 18, 1952

2,589,235

UNITED STATES PATENT OFFICE 2,589,235

REELING DEVICE

Victor I. Dudley, Franklin, Pa., assignor to Joy Manufacturing Company, Pittsburgh, Pa., a corporation of Pennsylvania Application June 15, 1948, Serial No. 33,060

10 Claims. (Cl. 242—91)

This invention relates to a reeling device, especially to a guide means for a reeling device such as is used in paying out and reeling in power cable which carries electric power to an automotive vehicle.

Vehicles such as the electrically operated shuttle cars used in mining operations are often supplied with power by means of a cable which is wound on a reel, and which winds and unwinds as the car passes back and forth. The reeling device (cable reel, spooling device, and guide means) should be a simple and foolproof appliance in which the guide means receives or dispenses the cable at various angles and guides it to or from the spooling device. The guide means should not produce any unnecessary wear on the cable, and should therefore be provided with smooth, rounded edges so as to offer a minimum of frictional resistance to the moving cable. The guide means should receive cable from or feed it to the reel at a point approximately midway between the ends of the reel in order to keep the maximum amount of bend or wrap of the cable as small as possible. The guide means should furthermore provide for paying out cable near the outer edge of the vehicle to eliminate the possibility of the vehicle running over the cable during the operation known as back-spooling. It should also provide for passage of the cable across the front of the vehicle without damage to the cable by rubbing against the frame. The design of the guide means should permit easy transition of the cable from reeling in to paying out and back-spooling, as the vehicle, moving forward, passes the point at which the cable is connected to the power line.

It is an object of this invention to provide an improvement in a reeling device which will permit a power cable to wind onto and off a cable reel through a spooling device with a minimum of injury to the cable. It is another object of this invention to provide a reeling device which will manage the power cable in such a way as to substantially eliminate the likelihood of the vehicle running over its own cable. It is still another object of the invention to provide a reeling device which readily allows the cable freedom to change the angle it makes in relation to a given reference axis of the vehicle as the vehicle passes the point at which the cable is connected to the power line. These and other objects are accomplished in a guide means for a reeling device which guides the cable between two plates spaced apart something more than the corresponding cable dimension, the plates having a plurality of guide pulleys disposed to constrain the cable in a direction normal to the constraint put on it by the plates; the guide means is furthermore provided with smooth and rounded edges wherever the cable is likely to come into contact with it.

In the drawings:

Fig. 1 is a top plan view of a shuttle car embodying this invention;

Fig. 2 is a side elevation of the shuttle car of Fig. 1;

Fig. 3 is an enlarged top plan view of that portion of the shuttle car which embodies the invention;

Fig. 4 is a side elevation, also enlarged, showing the invention;

Fig. 5 is a view in section on the plane of line 5—5 of Fig. 4;

Fig. 6 is a view in section on the plane of line 6—6 of Fig. 4;

Fig. 7 is a view in section on the plane of line 7—7 of Fig. 3;

Fig. 8 is a view in section on the planes of line 8—8 of Fig. 3.

Fig. 9 is a front elevation as seen from the plane of line 9—9 of Fig. 3; and

Fig. 10 is a view similar to Fig. 4 showing a portion of the device of Fig. 4 and illustrating another operating position.

The invention is shown here as being applied to a shuttle car such as is used in many mechanized mining operations. As will be understood by those skilled in the art such a shuttle car does not usually turn completely around, and is adapted to travel with equal ease and speed in either direction. Notwithstanding this characteristic of shuttle cars, it is customary to refer to one end of the car as the front end and to refer to travel of the car in a given direction as forward travel. The shuttle car 2 in the drawings is provided with an endless chain conveyor indicated generally at 4. The discharge or unloading end 6 of the conveyor is conventionally referred to as the forward end of the vehicle and motion of the vehicle in the direction of the arrow 8 is conventionally considered forward motion.

The vehicle is provided with four dirigible wheels 10, controlled from an operator's control station indicated generally at 12, which is provided with a suitable steering wheel 14, alternate seats 16 and 17 for forward and rearward travel respectively, and other control appurtenances which will not be detailed here. The conveyor may be driven electrically through a worm-gear train 18 and a universally mounted drive shaft 19. The discharge end 6 of the conveyor is adapted to be raised by hydraulic jacks 20 for unloading of the car into a mine railway car, as will be understood by those skilled in the art.

The wheels 10 are individually powered by electric motors, one of which is shown at 22, which are connected to receive electric power through a power cable 24. The cable 24 is connected at one end to a power line, not shown, and at its other end to a suitable collector device, also not shown. The excess length of the cable is wound onto a cable reel 26 which is connected to be driven by a hydraulic motor 28. Cable is fed to and from the reel 26 through a level-wind spooling device indicated generally at 30 and connected to be driven by cable reel 26 through any suitable drive means 32. The details of the cable reel, cable reel drive, and spooling device are not shown here but are disclosed in patent application Serial No. 597,617, filed June 5, 1945, and assigned to the assignee of the present invention.

Cable is fed to and from the spolling device through a guide means which serves to guard the cable against treatment which might result in damage thereto. Referring now in detail to the guide means, two spaced apart guide members 34 and 36 consist of substantially parallel plates secured in any suitable manner to the side of the vehicle at or near its forward end. A spacer 38 serves to re-enforce the construction and maintains the two guide members 34 and 36 a predetermined distance apart. A rotatable guide member 40 consisting of a grooved pulley is mounted between the spaced apart guide members for rotation on a spindle 42. The spindle 42 is preferably provided with a suitable bearing 44 and lubricating means 46. Rotatable guide means 40 is disposed so that its periphery at its outermost edge is in the near vicinity of the extreme side boundary of the vehicle. See especially Figs. 1 and 3. A second rotatable guide means 48 is shown as being mounted between the spaced apart guide members for rotation on the spindle 50. Spindle 50 is provided with suitable bearing means 52 and lubricating means 54. A third rotatable guide member 56 is mounted between the spaced apart guide members for rotation on a spindle 58. Spindle 58 is provided with suitable bearing means 60 and lubricating means 62.

Referring now in greater detail to the mounting means for the rotatable guide member 40 (see especially Fig. 6), the spindle 42 is shown as having a flange 64 at its one end which rests against the top face of the guide member 34. A large diameter portion 66 extends through an opening 68 in the guide member 34. A reduced diameter portion 70 of spindle 42 extends through an opening 72 in the guide member 36. A nut 74 has threaded engagement with the end of the spindle and holds the parts together. An intermediate reduced diameter portion 76 of the spindle carries the aforementioned bearing 44. The inner race of bearing 44 fits against a shoulder 78 formed at the juncture of the two different diameter portions 66 and 76. A bushing 80 surrounds the small diameter portion 70 and abuts against the shoulder formed by the two different diameter portions 70 and 76. A bearing plate 82 is disposed between the upper face of guide member 36 and the lower end of bushing 80. The outer race of bearing 44 is carried in a hub 84 of the rotatable guide member 40. The guide member 40 is secured against axial displacement by the aforementioned bearing 44, inwardly extending flange 86 on hub 84, and cover plate 88 secured to the hub 84 by any suitable means such as the screws shown.

The details of the mounting means for rotatable guide members 48 and 56 are substantially the same, so only one description thereof will be set forth. As is best seen in Figs. 7 and 8, the spindle on which the pulley rotates is provided with a flange 90 which rests against the upper face or surface of guide member 34. The spindles 50 and 58 extend through openings 92 and 94 respectively in the guide member 34, and through openings 96 and 98 respectively in the guide member 36. The spindles 50 and 58 are tangentially slotted as shown at 100. A retainer plate 102 extends into the slot 100 and is held in place by a screw 104. Each bearing 52 or 60 of rotatable member 48 or 56 consists of a bushing 106 which has a flange 108 at its lower end. A dust or oil seal 110 is provided at the upper end of bushing 106. A spacer washer 112 is provided between the flange 108 and the upper surface of guide member 36.

Those portions of the edges of the guide members 34 and 36 which are exposed to contact with the cable 24 are provided with smooth round beads 114 and 116 respectively. As is best seen in Fig. 6, the lowermost edge of bead 114 is substantially tangent to the lowermost face of guide member 34, whereas the bead 116 is substantially centered in relation to its associated guide member 36, resulting in a substantial portion of the bead 116 extending beyond the surface of the guide member 36 into the space between the guide members.

As is best seen in Figs. 1, 3 and 5, the forward edge 118 of each guide member 34 and 36, and corresponding portions of the associated beads 114 and 116, extends from a point adjacent the periphery of guide member 48 outward from the vehicle and rearward in a straight line to a point adjacent the periphery of the guide member 40. The trailing edge 120 extends from a point adjacent the periphery of guide member 40 inward and forward in a straight line toward the side of the vehicle. Where a third rotatable guide member 56 is employed, the diagonal portion of the trailing edge 120 need extend only to a point adjacent the periphery of the guide member 56.

The guide members 34 and 36 are preferably spaced apart a distance something more than the thickness of the power cable 24, but are still relatively close together so as to constrain or guide the cable in a plane between the two guide members. It is, of course, realized that a plane has no thickness from the standpoint of pure mathematics. It will, however, be understood that the plane of constraint referred to as being provided by the guide members 34 and 36 permits the cable 24 some slight degree of movement because it is not practical to have the two guide members in close contact with the cable 24; therefore the plane of constraint provided by the two spaced apart guide members does have a thickness as a practical matter.

It will further be understood by those skilled in the art that, although the guide members themselves move with respect to the ground, they are fixed with respect to the rest of the shuttle car structure including the cable reel except at such times as they move upward with the discharge end of the conveyor under the influence of the hydraulic jacks 20. It should be noted that such movement normally does not take place while the car itself is moving; accordingly, the guide members are normally fixed and the expression "normally fixed" will be understood to refer to the circumstances outlined above.

The guide members 34 and 36 may be given additional support and rigidity by such means as the diagonal brace shown at 122. The beads 114 and 116 may terminate at their inner ends of the trailing edge at the edge of a box section 124 of a bracket which secures the guide members 34 and 36 to the side of the vehicle.

Fig. 10 shows in dotted lines a partially elevated portion of the unloading end of the conveyor. As the forward end of the conveyor is raised by means of hydraulic jacks 20, the power cable 24 is necessarily raised because the guide means is elevated also. As the guide means is raised, the angle formed by that portion of the power cable back of the trailing edge with the ground is increased, and this increase in the angle serves to raise the hinged cover 126 which is provided over the top of the housing 128. The forward slope of the trailing edge 120 along with the hinged cover 126 allows for a minimum of deflection or bend in the cable. To further protect the cable against injury, the forward edge of the cover 126 is beaded as shown at 130. It should be remembered that the power cable normally does not move when the discharge end of the conveyor is elevated, as in Fig. 10, because the car is normally stationary at such times. Note that elevation of the discharge end of the conveyor does not affect the normal restraining function of the spaced apart guide members because rarely if ever will the car itself be moving any substantial distance while the jacks 20 are raising or lowering the discharge end of the conveyor.

*Operation*

As the shuttle car moves forward taking in cable or moves backward paying out cable, the cable that is between the car and the power source extends forward ahead of the car, as shown in the drawings. The cable is guided or constrained in a horizontal plane during such movement by the two spaced apart guide members 34 and 36, but has contact principally with the rounded edges or beads 114 and 116. Inasmuch as the bead 116 is raised above the upper surface of its associated guide member 36, the cable comes into contact principally with the bead 116 and hardly touches the flat plane member 36. Such guiding of the cable as may require restraining in the horizontal direction is provided by the guide pulleys 40, 48 and 56. Thus, the cable is restrained in the vertical direction by the spaced apart plates and in a direction normal thereto by the pulleys. Or, putting it another way, the spaced apart guide members constrain the moving cable in a given plane, and the pulleys constrain it within the plane.

With the cable extending out ahead of the car and with the car moving in the forward direction so that it is taking in cable, continued movement of the car in the forward direction will ultimately bring the car opposite the point at which the cable is secured to the power source or line. As the car passes this point, the cable between the car and the source necessarily moves from a position extending out in front of the car to a position in which it trails alongside the car. This is the operation known as back-spooling. As the cable changes from the position shown in the drawings in which it extends out ahead of the car to the trailing position, it must be allowed to move smoothly from its forward extending position to a position in which it is wrapped around the pulley or guide member 40. It has been found that a straight-line leading edge which extends outward and rearward from the pulley 48 to the pulley 40 makes for the smoothest transition from the forward extending position to the trailing position of the cable. With the rearward-extending straight-line leading edge 118, the cable moves easily and smoothly across this leading edge and wraps easily around the pulley 40 in ready transition to the back-spooling position. With the cable extending alongside the car, provision must be made for laying the cable out far enough so that the car will not run over its own cable. This is provided for by locating the pulley 40 closely adjacent the side boundary of the vehicle.

More specifically, the car does not run over its own cable because pulley 40 extends outward at least as far as the wheel or wheels on that side. Actually, in the embodiment shown, pulley 40 extends out beyond the outermost edges of the wheels. This is best seen in Fig. 1, which shows a portion of each of the rear wheels and wherein it can readily be seen that the edges of the car extend out beyond the outermost edges of the rear wheels, and therefore of course the reeling device and more specifically pulley 40 thereof, extends out beyond the rear wheel on that side. In the embodiment shown in the drawings, the front wheels are actually alined with the rear wheels as is customary in standard shuttle cars, but nothing need be said about the front wheels because the rear wheel which is on the same side as the reeling device is of course at least one wheel on that side which could run over the cable and damage it, and the invention is of course applicable to three-wheeled car structures in which the third wheel would probably be mounted midway between the two sides. As the car now backs up while back-spooling, it picks up cable from alongside the car and reels it in, as the car continues to move rearward. As the car again passes the point at which the cable is secured to the power line, the cable moves easily across the straight line leading edge 118 from the trailing position to the forward extending position.

It will of course be understood by those skilled in the art that a shuttle car may operate with its power cable attached to a power source located anywhere within range of the cable, not necessarily between the two end points of its path. Thus, the cable could be secured at the end of the path of travel of the car. The example in the foregoing description was given in order to provide a better illustration of the operation of the invention, and of the advantages thereof.

As has been set forth herein, shuttle cars do not turn completely around. There are occasions, however, when it is desirable to turn the car through 90°. On some such occasions, it will be found that the cable will pass temporarily across the forward end of the car. When this happens, it is desirable that the cable move across the front end of the car with a minimum of interference, and accordingly with a minimum of injury to the cable. This is provided for by positioning the pulley or guide member 48 immediately adjacent the forward edge of the vehicle, as shown in Figs. 3 and 5.

As the cable is fed onto or from the reel by the spooling device, the angle made by that portion of the cable between the pulley 40 and the spooling device 30, with that portion of the cable extending out ahead of the car, varies from zero to a maximum. The maximum amount of deflection is provided with the spooling device at one end of its travel, very much as shown in Fig. 3. In order that this maximum deflection may be kept as small as possible, the pulley 40 is so disposed and its size is such that a straight line tangent to its inner periphery and parallel to the long axis of the car passes across a point approximately midway between the ends of the spooling device.

When the car is unloaded, where conditions permit, the discharge or forward end of the conveyor is elevated by the hydraulic jacks 20 (see especially Fig. 10). In the course of this elevating operation, that portion of the cable in the guide means is necessarily elevated along with the rest of the mechanism, and the cable between the guide means and the spooling device is necessarily deflected. Distortion of the cable is kept at a minimum by hinging cover 126, and by giving the trailing edge 129 of the guide means a forward inclination, as seen in Figs. 1, 3 and 5. The manner in which the forward extending trailing edge minimizes the distortion will be best understood by visualizing the spooling device as being at the opposite end of its travel from that shown in Fig. 3. It will be understood that the cable 24 is not in motion when the discharge end of the conveyor is being raised or lowered, nor while the car is being unloaded.

As will be understood by those skilled in the art, the design of the car should be such that no portion of the guide means extends beyond the outermost circle formed by the adjacent portion of the car, in order that the guide means may not be bumped and injured by the mine wall as the car turns. In other words, with the car wheels turned for the sharpest possible turn to the left in the forward direction, the point P, Fig. 1, describes a certain curve, and all portions of the guide means fall inside that curve.

The advantages of the invention disclosed herein lie in its simplicity, in the ease with which the cable is guided to and from the spooling device for both forward and rearward movement of the car for both forward and backward spooling operations, and in the fact that the guide means provides smooth edges for contact with the cable. The cable is subjected to a minimum of bending and distortion, and the cable is handled in such a manner as to substantially eliminate the possibility of the vehicle running over its own power cable.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In a power cable reeling device, a cable reel, a pair of spaced apart normally fixed guide members arranged to constrain a moving cable in a given plane between said members as it winds onto or off said reel, a bead secured to each of the guide members in position to contact the moving cable, each bead being of a thickness substantially greater than the thickness of its associated guide member, and a plurality of rotatable guide members mounted between the spaced guide members so as to constrain the moving cable within the aforesaid plane.

2. The device set forth in claim 1, in which said spaced apart guide members are disposed substantially horizontal and the bead on the lower guide member is raised above the surface of said lower guide member.

3. The device set forth in claim 1, in which the device is mounted at one side of a vehicle having at least one ground-engaging member at said side, one rotatable guide member being disposed with a part of the periphery extending outward at least as far as the outer face of said at least one ground engaging member.

4. The device of claim 1, in which one rotatable guide member is located with its periphery substantially tangent to a plane normal to the axis of rotation of the cable reel and which cuts the reel approximately half way between its ends.

5. In a power cable reeling device for a vehicle having at least one ground-engaging member mounted adjacent a side edge of the vehicle, a cable reel, a pair of spaced apart normally fixed guide members arranged to constrain a moving cable in a given plane between said guide members as it winds onto and off said reel, a bead secured to each of the guide members in position to contact the moving cable, each bead being of a thickness substantially greater than the thickness of its associated guide member, a rotatable guide member mounted between the spaced apart guide members with a part of the periphery extending outward at least as far as the outer face of said at least one ground-engaging member, and at least one other rotatable guide member mounted between the spaced apart guide members, each of the spaced apart guide members having a forward edge which extends in a straight line from a point adjacent the periphery of said other rotatable guide member outward and rearward to a point adiacent the periphery of the first-named rotatable guide member.

6. The device of claim 5, in which each of the spaced apart guide members has a trailing edge which extends from a point adjacent the periphery of the first-named rotatable guide member inward and forward.

7. In a shuttle car having side edges and at least one ground-engaging member mounted adjacent one edge, in combination, a cable reel, a pair of normally fixed guide members mounted in spaced apart relation adjacent said one edge to constrain a moving power cable between said guide members in a given plane as a cable winds onto and off said reel, a rotatable guide member mounted between the fixed guide members, the rotatable guide member being mounted with a part of the periphery extending outward at least as far as the outer face of said at least one ground engaging member to lay the moving cable alongside the car away from the ground engaging member during back-spooling.

8. In the combination of claim 7, a second rotatable guide member mounted between the spaced apart guide members and adapted to cooperate with the first mentioned rotatable guide member to constrain the power cable within said given plane.

9. A combination as in claim 8, in which the second rotatable guide member is located forward and inward from the first-named rotatable guide member, and the spaced apart guide members each have a leading edge which extends rearward and outward from the periphery of the second-named rotatable guide member to the periphery of the first-named rotatable guide member.

10. In a shuttle car having side edges and at least one ground-engaging member mounted adjacent one side edge, in combination, a cable reel, a pair of normally fixed guide members spaced apart to define a plane of constraint for a moving power cable as it winds onto and off said reel, and a pulley rotatably mounted between the guide members to constrain the moving cable within said plane, the pulley being mounted with a part of the periphery extending outward at least as far as the outer face of said at least one ground engaging member to lay the moving cable alongside the car away from the ground engaging member during back-spooling.

VICTOR I. DUDLEY.

REFERENCES CITED

The following references are of record in the file of this patent:

UNITED STATES PATENTS

| Number | Name | Date |
| --- | --- | --- |
| 641,935 | Chalmers | Jan. 23, 1900 |
| 823,231 | Tarbox | June 12, 1905 |
| 1,069,037 | Sessions | July 29, 1913 |
| 1,820,495 | Richardson | Aug. 25, 1931 |
| 1,935,585 | Tornblom | Nov. 14, 1933 |